United States Patent
Xiao et al.

(10) Patent No.: US 7,085,582 B2
(45) Date of Patent: Aug. 1, 2006

(54) PILOT INFORMATION GAIN CONTROL METHOD AND APPARATUS

(75) Inventors: Weimin Xiao, Hoffman Estates, IL (US); Rapeepat Ratasuk, Schaumburg, IL (US); Amitava Ghosh, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 500 days.

(21) Appl. No.: 10/210,142

(22) Filed: Jul. 31, 2002

(65) Prior Publication Data

US 2004/0023659 A1    Feb. 5, 2004

(51) Int. Cl.
*H04B 7/00* (2006.01)
*H04B 7/212* (2006.01)
*H04Q 7/20* (2006.01)

(52) U.S. Cl. ............... 455/522; 455/464; 455/509; 455/452.1; 455/450; 370/442; 370/294; 370/280; 370/314; 370/337

(58) Field of Classification Search ............ 455/450, 455/452.1, 423, 425, 464, 509, 522; 370/329, 370/335, 342, 320, 326, 294, 280, 314, 337, 370/347, 442
See application file for complete search history.

(56) References Cited

U.S. PATENT DOCUMENTS

| | | | |
|---|---|---|---|
| 5,506,865 A * | 4/1996 | Weaver, Jr. ............. 370/335 |
| 5,737,327 A | 4/1998 | Ling et al. |
| 5,802,110 A * | 9/1998 | Watanabe et al. ........... 375/259 |
| 5,901,354 A | 5/1999 | Menich et al. |
| 6,067,292 A * | 5/2000 | Huang et al. ............... 370/342 |
| 6,347,220 B1 * | 2/2002 | Tanaka et al. ........... 422/277.2 |
| 6,377,555 B1 | 4/2002 | Lee et al. |
| 6,408,039 B1 * | 6/2002 | Ito ............................. 375/347 |
| 6,795,488 B1 * | 9/2004 | Iwakiri ....................... 375/148 |
| 6,842,442 B1 * | 1/2005 | Okawa et al. ............. 370/335 |
| 6,859,505 B1 * | 2/2005 | Agami et al. ............... 375/345 |
| 6,865,218 B1 * | 3/2005 | Sourour ..................... 375/148 |
| 6,917,642 B1 * | 7/2005 | Rouphael et al. .......... 375/140 |
| 2002/0122471 A1 * | 9/2002 | Ling ........................... 375/147 |
| 2002/0137514 A1 * | 9/2002 | Mitsugi et al. ............ 455/436 |
| 2003/0067938 A1 * | 4/2003 | Schmidt ..................... 370/441 |
| 2003/0095529 A1 * | 5/2003 | Petre et al. ................ 370/342 |
| 2003/0153311 A1 * | 8/2003 | Black .......................... 455/436 |

OTHER PUBLICATIONS

Park, Seung Jong, et al. "*Optimal power Allocation in CDMA Forward Link Using Dependency between Pilot and Traffic Channels.*" IEEE. 1999. VTC '99. pp. 223-227.

(Continued)

*Primary Examiner*—Charles Appiah
*Assistant Examiner*—Huy Phan (57) ABSTRACT

Various gain factors for pilot information are used to determine a corresponding plurality of likely channel performance values for a plurality of data channels (and/or services). The resultant information is used to select a specific gain factor to apply when transmitting the pilot information. In one embodiment, the gain factor that correlates to the highest signal to interference plus noise ratio is used.

15 Claims, 5 Drawing Sheets

U.S. PATENT DOCUMENTS

2003/0156563 A1* 8/2003 Papasakellariou et al. .. 370/335
2003/0189911 A1* 10/2003 Saifuddin et al. ........... 370/335
2004/0010744 A1* 1/2004 Chen et al. ................. 714/755
2004/0085892 A1* 5/2004 Walton et al. ............... 370/208
2005/0013350 A1* 1/2005 Coralli et al. ............... 375/148
2005/0050432 A1* 3/2005 Chen et al. ................. 714/776

OTHER PUBLICATIONS

Phoel, Wayne G., et al. "*Optimization of the Pilot-to-Data Power Radio for DS-CDMA with Linear Interference Suppression.*" IEEE. 2000. pp. 619-623.

* cited by examiner

PILOT INFORMATION GAIN CONTROL METHOD AND APPARATUS

TECHNICAL FIELD

This invention relates generally to wireless communication systems and more particularly to pilot information as used in such systems

BACKGROUND

Wireless communication systems that use pilot information are well known in the art. Pilot information generally serves to facilitate an assessment of the wireless channel by a receiving party. By providing pilot information having known characteristics, a receiver can utilize its knowledge of the differences (such as amplitude and phase differences) between the pilot information as it should have been received and the pilot information as it was received to ascertain and compensate for alterations that were occasioned by the channel to thereby promote a more accurate recovery of other information as was also received by the receiver via that channel. Pilot information can also be used to effect other purposes as well.

Unfortunately, there are a variety of trade-offs that are ordinarily accepted when combining pilot information with a user payload. Such trade-offs, in various ways, usually impact the usable bandwidth or user payload throughput capacity of the channel. For example, in a code division multiplexed wireless communication system that makes use of orthogonal variable spreading factor codes to permit differentiation of a number of data channels, a control channel that includes pilot information will also have, or share, such a code. Within the context of such a system, this means that some portion of overall available power must be allocated for the control channel/pilot information. When less power than is necessary at any given moment is used to support the pilot information, however, user information throughput capacity is negatively impacted.

Conversely, of course, the opposite can also occur. More power may be accorded the pilot information than is necessary to overcome the present vagaries of the channel. As a result, less power is available for the user payload and this again can lead to a diminution of the receiver's ability to properly decode the user payload.

One prior art approach relies upon a simulated study of a channel for a given set of conditions (such as, for example, a given data rate and service overhead for the data payload). Running the simulation develops a set of corresponding gain factors to be used with the data/control channel. By providing these results in a look-up table, the gain factor as corresponds to a given data rate and service can then be recovered and used during ordinary operations. One significant drawback of this approach is that this technique does nothing to assist a wireless communication unit that must use, for whatever reason, a data rate that is not represented in the look-up table. Since new data rates are a common and frequent occurrence, this constitutes a considerable obstacle to effective use.

BRIEF DESCRIPTION OF THE DRAWINGS

The above needs are at least partially met through provision of the pilot information gain control method and apparatus described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, these various embodiments determine likely channel performance characteristics for a plurality of data channels when using each of a plurality of different pilot information power transmission values. A particular power transmission value is then selected as based, at least in part, on these channel performance values. This configuration achieves a more effective trade-off between power allocated for the pilot information and for the user data payload. Further, this approach readily accommodates new data rates and new services. This approach is also compatible with, for example, spreading code-differentiated data channels alone or where at least some of the data channels are themselves time multiplexed.

In one embodiment, a control channel contains the pilot information. The power transmission value as ascertained above can be used for the entire control channel if desired, or only a part thereof (provided the selected part includes the pilot information). When determining the likely channel performance value, signal to noise ratios can be considered and, in a preferred embodiment, signal to interference plus noise ratio values are used. In a preferred embodiment, selection of a particular power transmission value to use with the pilot information is based, at least in part, on a max-ratio combination of weighted sums that correspond to the channel performance values.

Such power transmission values can be determined at a base radio or at a mobile/portable radio and further can be used at the source of determination or transmitted elsewhere for remote usage.

Figure 1:
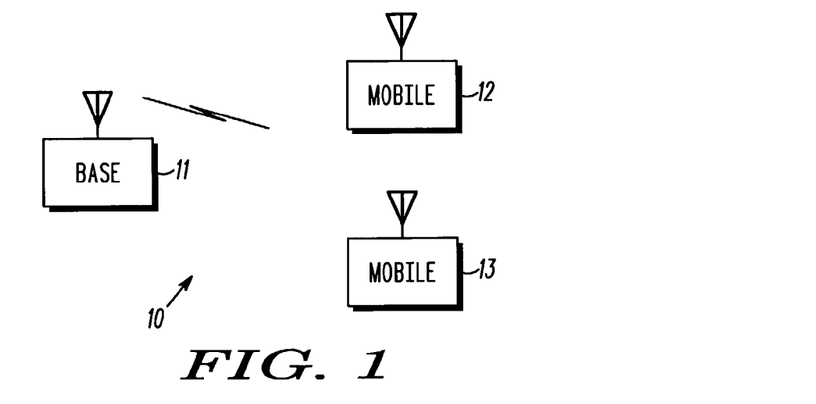
FIG. 1 comprises a block diagram depiction of a wireless communication system as configured in accordance with an embodiment of the invention.

Referring now to the drawings, and in particular to FIG. 1, a typical wireless communication system 10 includes one or more base units 11 and a plurality of mobile units 12 and 13. For purposes of providing a detailed description, this system 10 will be presumed to be a code division multiple access system using orthogonal variable spreading factor codes (such as, for example, Walsh codes) to aid in differentiating various channels from one another as they are co-transmitted on a radio frequency transport channel of choice. Such systems are generally well known, and no further description will be provided here except where occasionally useful to aid in further understanding one or more aspects of these embodiments.

Figure 2:
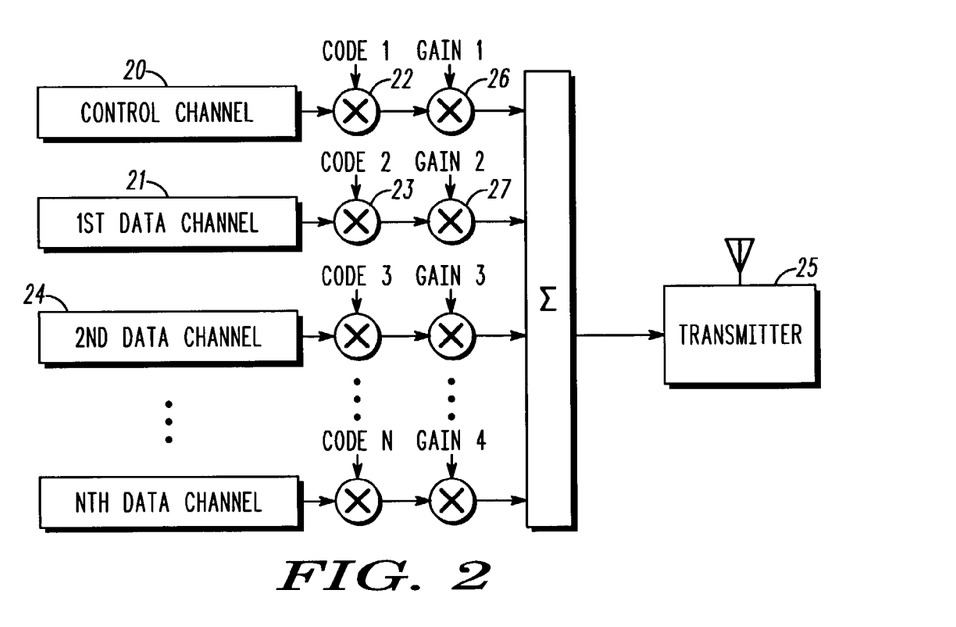
FIG. 2 comprises a block diagram/schematic view of channel coding as configured in accordance with an embodiment of the invention.
Figure 3:
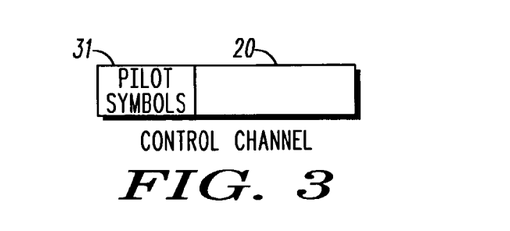
FIG. 3 comprises a schematic view of a control channel as configured in accordance with an embodiment of the invention.

Referring now to FIG. 2, a given base unit within such a system 10 can typically accommodate a plurality of information channels. In this embodiment, these channels include a control channel 20 and a plurality of data channels (such as a first data channel 21). Such a control channel can support coding at, for example, a 15 k bits/sec rate and will preferably (though not necessarily) include power control information (for purposes other than pilot information gain control), data packet information, and, of course, pilot information 31 as depicted in FIG. 3. (In this embodiment, for illustration purposes only, the pilot information is comprised of seven consecutive pilot symbols in accordance with well understood prior art technique. Also, as depicted in FIG. 3, the pilot symbols are shown as being positioned at the head of the control channel frame. Such positioning is for illustration purposes only. It is well understood in the art that pilot symbols can be positioned as a group elsewhere or can be separated from one another and interleaved with other data elements in the frame.)

Figure 4:
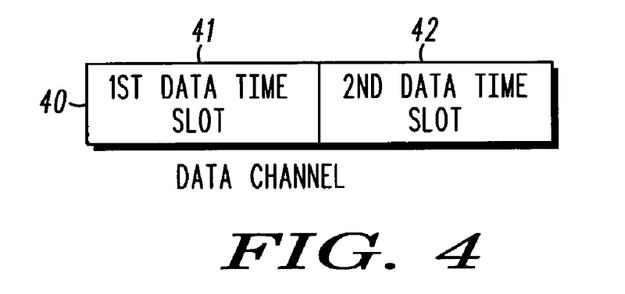
FIG. 4 comprises a schematic view of a multiplexed data channel as configured in accordance with another embodiment of the invention.

Each data channel will typically include both a data payload and a corresponding data rate or other features to ensure compatibility with a given communications service. For purposes of this illustration, it will be presumed that the data rates for the data channels can be up to and including about 2M bits/sec. As shown in FIG. 2, each data channel represents a single data payload. If desired, however, one or more of these data channels can itself be time multiplexed as generally indicated in FIG. 4. For example, a single data channel 40 can be multiplexed with respect to time to create two data slots 41 and 42 (for purposes of simplicity, only two such slots are depicted in FIG. 4; those skilled in the art will appreciate that more such slots could be provided as desired and/or as appropriate to a given application). In addition, each such slot can accommodate a data rate or other service feature that is different than that being used for the other data slot. Again, such configurations are known in the art and additional detail need not be provided here. (It will also be appreciated that, for many prior art systems, time multiplexed channels tend to characterize the forward link and non-time multiplexed channels as suggested in FIG. 2 tend to characterize the reverse link.)

Each channel (including both the control channel(s) and the data channels) are processed in a known manner with a unique corresponding spreading code such as, in this example, a Walsh code. For example, the control channel 20 is processed 22 using a first spreading code and the first data channel 21 is processed 23 using a second spreading code, such that each channel is processed with a separate code. As is known, by using codes that are orthogonal to one another, the different channels as coded can then be combined 24 and transmitted via a common transport channel transmitter 28 and then readily differentiated again upon receipt.

Pursuant to this embodiment, each data channel and control channel has a corresponding gain as well. For example, the control channel 20 has a first gain 26 and the first data channel 21 has a second gain 27 (in a prefered embodiment, all of the data channels will use an identical gain factor). This overall architecture comprises one way to realize a differential-gain amplifier that responds to the control messages of a power controller to differentially supply power to the control channel as compared to the power that is supplied to one or more of the data channels. As will be made more clear below, the power controller provides specific differential power control information as a function, at least in part, of likely channel performance for each (or at least most) of the data channels as determined for a variety of gain factors for the pilot information itself In fact, many transmitter units already have the capability to alter gain as described above and also represent a relatively flexible and powerful programmable processing platform. Therefore additional description of the hardware aspects of the base unit will not be presented here in favor of a more detailed description of the programmed operation thereof.

Figure 5:
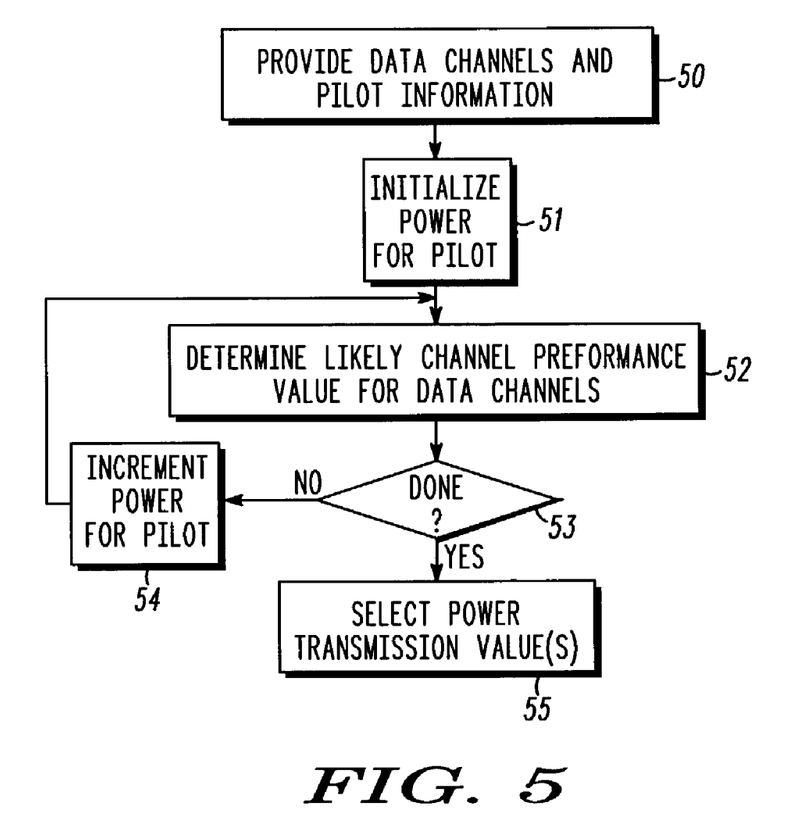
FIG. 5 comprises a flow diagram as configured in accordance with an embodiment of the invention.

Referring now to FIG. 5, the overall process begins with the provision 50 of pilot information and a plurality of data channels (for example, as described above). A power transmission value for use with the pilot information is initialized 51 (for example, by setting the power transmission value to a predetermined known value, such as the lowest possible setting for such value). A determination 52 then follows as to corresponding likely channel performance for at least some and preferably all of the data channels when using this initial power transmission value for the pilot information. This determination can be made with respect only to a given leg within the system or can include multiple legs as desired by the user. The channel performance can be estimated, for example, by determining a likely signal to noise ratio value or, in a preferred embodiment, a likely signal to interference plus noise ratio value. Pursuant to one embodiment, such a value could conceivably be obtained through appropriate accessing of a look-up table. Since the requisite calculations are not especially complicated or processing resource intensive, for most applications a preferred approach would be to calculate the values as needed.

Until this process is done 53, the pilot power transmission value is incremented 54 by a predetermined amount and the above process repeats with the new pilot power transmission value. The process is done 53 when all candidate pilot power transmission values have been tested in this fashion and a plurality of corresponding likely channel performance values obtained for the data channels. A particular pilot power transmission value is then selected 55 as based, at least in part, upon these likely channel performance values. For example, pursuant to one embodiment, one could simply identify the best likely channel performance value and select the pilot power transmission value that corresponds to that identified channel performance value. That selected pilot power transmission value can then be used in various ways. For example, it can be used immediately by the identifying platform when transmitting data and pilot information. As another example it could be transmitted or otherwise provided by the identifying platform to a remotely located transmitter which then uses the value when transmitting data and pilot information. As yet another example, it could be stored for later use.

Figure 6:
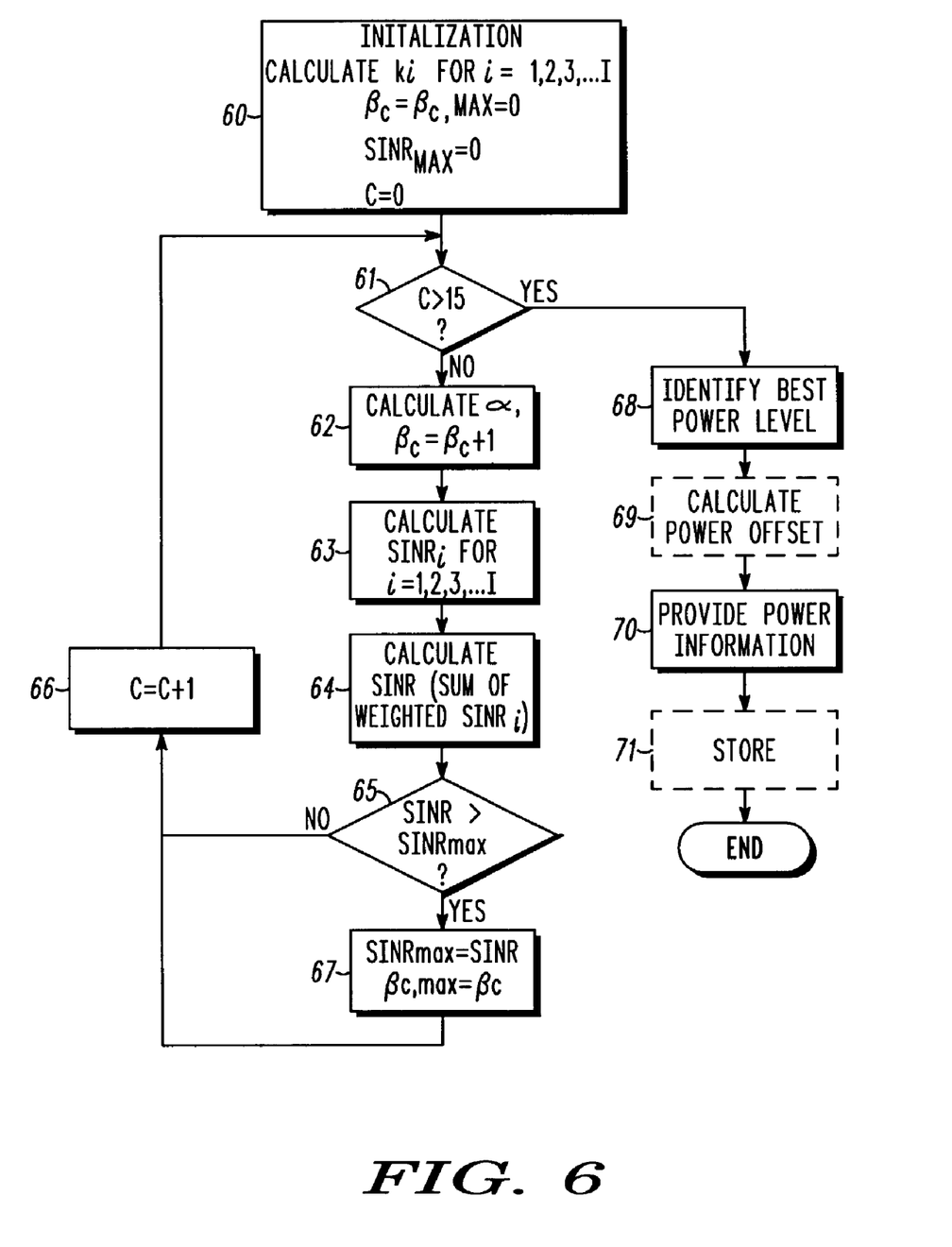
FIG. 6 comprises a detailed flow diagram as configured in accordance with an embodiment of the invention.

Referring now to FIG. 6, a more specific embodiment will be presented. This embodiment serves in part to make clear that the described technique will work with multiplexed services by maximizing the sums of the weighted signal to interference plus noise ratios from each service. This feature is particularly useful because the number of rate-matched symbols for each service in such a multiplexed context can vary significantly according to an assigned corresponding quality of service requirement. Such variations are a part of why many prior art approaches are less than fully satisfactory (for example, the sheer number of possible combinations of services and rate-matching parameters renders a table-based approach difficult at best).

In this particular embodiment, the wireless communication system is a so-called 3$^{rd}$ generation Universal Mobile Telecommunications System (UMTS) wideband code division multiple access system. The process begins, in this embodiment, with initialization 60. In addition to setting the pilot power transmission value β to a lowest possible value (in this example, zero) and initializing a signal to interference plus noise parameter SINR$_{max}$ and a count variable C (where the count variable corresponds to the total number of candidate pilot power transmission values) to zero, this step also sees to the calculation of the number K of rate-matched symbols for each transport channel per power control group (note that in the case of multiplexed services each service is usually mapped to a distinct transport channel). K can be calculated as:

$$K_i = \left\lceil \frac{N_{i,j} + \Delta N_{i,j}}{NP} \right\rceil \text{ for } i = 1, \ldots, I$$

where I is the number of time multiplexed services, $N_{i,j}$ is the number of bits in a radio frame before rate matching on the corresponding transport channel with transport format combination j, $\Delta N_{i,j}$ is the number of bits to be repeated or punctured in each radio frame, and NP is the number of power control groups in a radio frame. (The calculation of $N_{i,j}$ and $\Delta N_{i,j}$ is well understood in the art and hence additional description of their ascertainment will not be provided here.)

The count C is checked to determine 61 if all candidate pilot power transmission values have been tried. When not true, the process proceeds to calculate 62 a ratio of control channel power to total power α via the relationship:

$$\alpha = \left( \frac{\beta_c / 15}{1 + \beta_c / 15} \right)^2$$

The pilot power transmission value $\beta_c$ is then incremented to the next candidate for use during the next iteration of the process loop.

Next a corresponding signal to interference plus noise value is calculated 64 as follows. The signal to interference plus noise ratio for each transport channel is first calculated:

$$SINR_i = \frac{(1-\alpha)\alpha K_i}{\alpha(K_i - 1) + 1} \text{ for } i = 1, \ldots, I$$

The weighted signal to interference plus noise values for all transport channels are then summed as follows to yield the desired signal to interference plus noise ratio value SINR:

$$SINR = \sum_{i=1}^{I} w_i \times SINR_i$$

A comparison then determines 65 whether the resultant representative signal to interference plus noise ratio value SINR is greater or less than a previous SINR value that represents the largest SINR value to so far result from this iterative process. When true, the present SINR value is assigned 67 as the new SINRmax value (and the corresponding pilot power transmission value $\beta_c$ is similarly assigned as the new $\beta_{c,max}$). The loop count C is then incremented 66 and the above-described process repeats until all candidate pilot power transmission values have been similarly tested.

When all candidate pilot power transmission values have been tested as described, the best power level is then easily identified 68 as $\beta_{c,\ max}$. If necessary, a corresponding power offset value can be calculated 69 (for example, when the transmitter is configured to apply an offset value when changing power levels). The resultant power information is then provided and/or used 70 as appropriate. If desired, the results can also be stored 71 in a memory.

Figure 7:
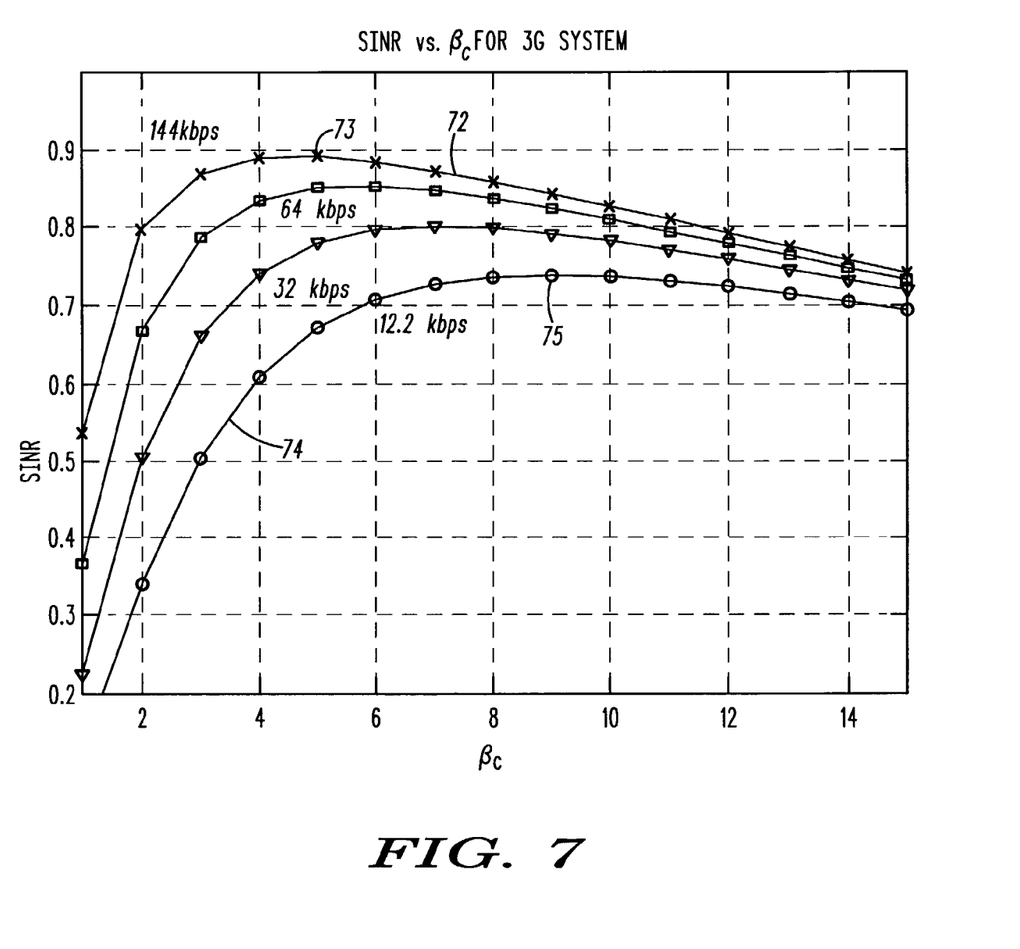
FIG. 7 comprises a graph depicting pilot information gain versus overall data recovery as configured in accordance with an embodiment of the invention.

FIG. 7 depicts various SINR values as result when using any of fifteen candidate pilot power transmission values $\beta_c$. In particular, it can be seen that different SINR values result when derived as a function of different services (in particular, data services offering data transmission rates of 12.2 kbps, 32 kbps, 64 kbps, and 144 kbps). This graph aids in appreciating that, for any given service, there is a pilot power transmission level (such as the levels indicated by reference numerals 81 and 82) that yields a maximum attainable signal to interference plus noise ratio value, and further it can be seen that power values less or greater than the optimum level tend to result in a reduced SINR value. Because the described process provides for recalculation of the pilot power transmission level on a regular and dynamic basis (as versus mere resort to a static look-up table) the process can readily accommodate newly introduced services and in particular can identify an optimum pilot power transmission value for use when supporting such services.

Figure 8:
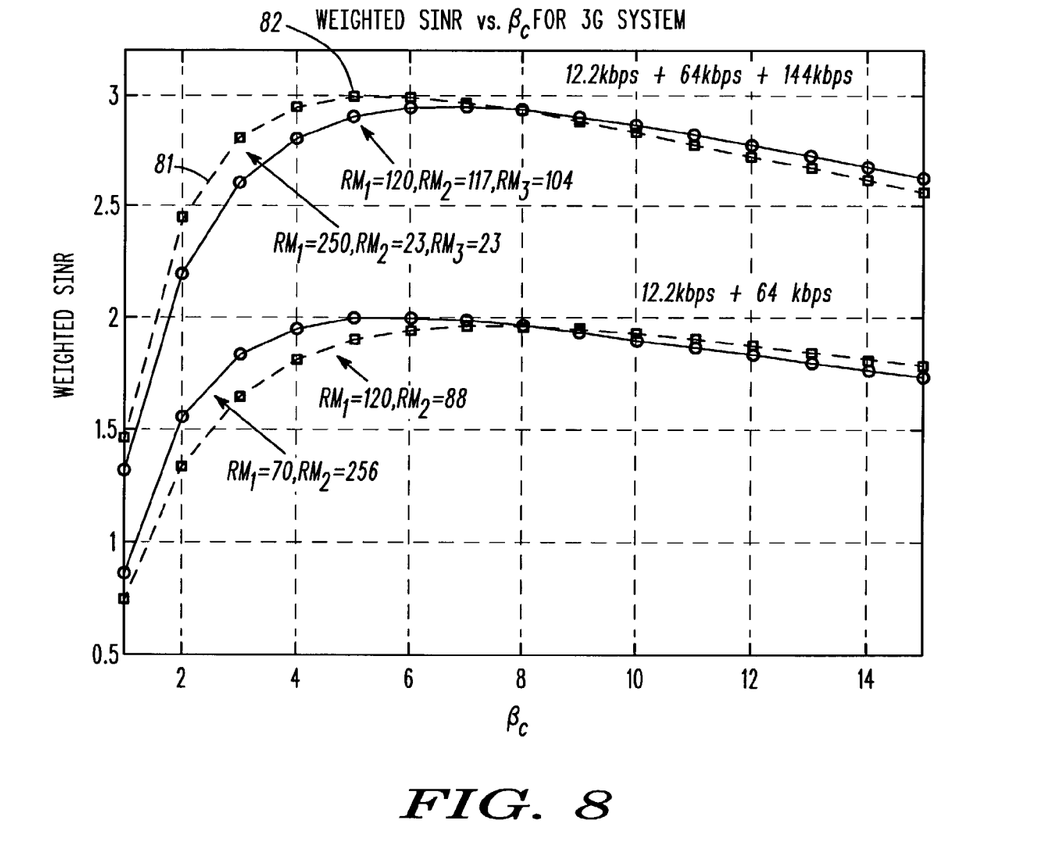
FIG. 8 comprises a graph depicting pilot information gain versus overall data recovery as configured in accordance with an embodiment of the invention.

FIG. 8 depicts various SINR values as result when using the candidate pilot power transmission values with various multiplexed services such as those supported by UMTS. In this example, three different services (having data rates of 12.2 kbps, 64 kbps, and 144 kbps respectively) are multiplexed together in varying respective proportions per frame. For example, a first series of results 81 are obtained for a given set of multiplexed services where the 12.2 kbps service represents 250 RM (note: the rate matching attribute RM is unit-less), the 64 kbps service represents 23 RM, and the 144 kbps service represents 23 RM. Again, the embodiments described herein are readily applicable for use with these widely varying combinations of services such that a substantially optimized pilot power transmission value can again be calculated and used accordingly.

So configured, the described process and apparatus utilizes a pilot gain factor selection technique to automatically allocate power to the pilot information as a function of a predetermined analysis. The analysis is based on maximizing the received signal to interference plus noise ratio at the receiver (since the signal to noise plus interference ratio is inversely proportional to the frame error rate, maximizing the signal to noise plus interference ratio will tend to minimize frame error rates for the system).

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method of determining a pilot transmission power value for multiple time-multiplexed data services that are code-multiplexed with a pilot channel from a user, the method comprising the steps of:
  providing a plurality of time multiplexed data services;
  providing pilot information;
  determining a user performance value for each of a plurality of pilot transmission power values according to $$Q_m = \sum_{i=1}^{l} w_i \times \frac{\beta_m K_i}{(\beta_m K_i + 1)(\beta_m + 1)}$$

where $\beta_m$ is the m-th pilot transmission power value, $K_j$ is the number of rate-matched bits per power control group used for data service i, $w_i$ is the weight given to data service i, and N is the total number of data services;
  selecting a selected pilot transmission power value $\beta_m$ to use with the pilot information as a function, at least in part, of the plurality of determined corresponding performance values.

2. The method of claim 1 wherein providing the pilot information includes providing a control channel.

3. The method of claim 2 wherein providing a control channel includes providing at least one pilot symbol.

4. The method of claim 2 wherein the control channel has a corresponding orthogonal variable spreading factor code.

5. The method of claim 1 wherein providing a plurality of data services includes providing at least one time multiplexed data service.

6. The method of claim 1 wherein determining a user performance value includes assigning a weight to each data service.

7. The method of claim 1 wherein selecting a pilot transmission power value to use with the pilot information as a function, at least in part, of the plurality of corresponding user performance values includes selecting a pilot transmission power value to use with the pilot information that corresponds to a best one of the user performance values.

8. The method of claim 1 and further comprising using the selected pilot transmission power value when transmitting the pilot information and the plurality of data services.

9. The method of claim 1 and further comprising transmitting the selected pilot transmission power value to subsequent use by a receiving unit.

10. The method of claim 1 wherein determining a likely channel performance value includes calculating the likely channel performance value.

11. An apparatus comprising:
  a wireless transmitter;
  a differential-gain amplifier operably coupled to the wireless transmitter;
  at least a first and second data channel operably coupled to the wireless transmitter;
  a pilot information source operably coupled to the wireless transmitter;
  a power controller operably coupled to the differential-gain amplifier and being arranged and configured to determine a user performance value for each of a plurality of pilot transmission power values according to $$Q_m = \sum_{i=1}^{l} w \times \frac{\beta_m K_i}{(\beta_m K_i + 1)(\beta_m + 1)}$$

where $\beta_m$ is the m-th pilot transmission power value, $K_j$ is the number of rate-matched bits per power control group used for data service i, $w_i$ is the weight given to data service i, and N is the total number of data services and to select a selected pilot transmission power value to provide variable power to pilot information and the data channels from the pilot information source based on the plurality of corresponding pilot transmission power value as a function, at least in part, user performance values when transmitted by the wireless transmitter.

12. The apparatus of claim 11 wherein the power controller includes means for:
  determining a user performance value for each of the data channels for each of a plurality of pilot transmission power values;
  selecting a pilot transmission power value to use with the pilot information as a function, at least in part, of the plurality of corresponding user performance values.

13. The apparatus of claim 12 wherein the user performance value comprises a signal to interference plus noise value.

14. The apparatus of claim 11 wherein the apparatus comprises a portable wireless communication device.

15. A method of determining power transmission value for multiple data channels multiplexed with a pilot channel from a user, the method comprising the steps of:
  providing a portable wireless communication device;
  providing a plurality of code division multiple access data channels;
  providing a code division multiple access control channel having pilot information;
  at the portable wireless communication device, determining a user performance value for each of a plurality of pilot transmission power values according to $$Q_m = \sum_{i=1}^{l} w_i \times \frac{\beta_m K_i}{(\beta_m K_i + 1)(\beta_m + 1)}$$

where $\beta_m$ is the m-th pilot transmission power value, $K_j$ is the number of rate-matched bits per power control group used for data service i, $w_i$ is the weight given to data service i, and N is the total number of data services;
  at the portable wireless communication device, selecting a selected pilot transmission power value $\beta_m$ to use with the pilot information as a function, at least in part, of the plurality of determined corresponding performance values.

* * * * *